Patented June 1, 1948

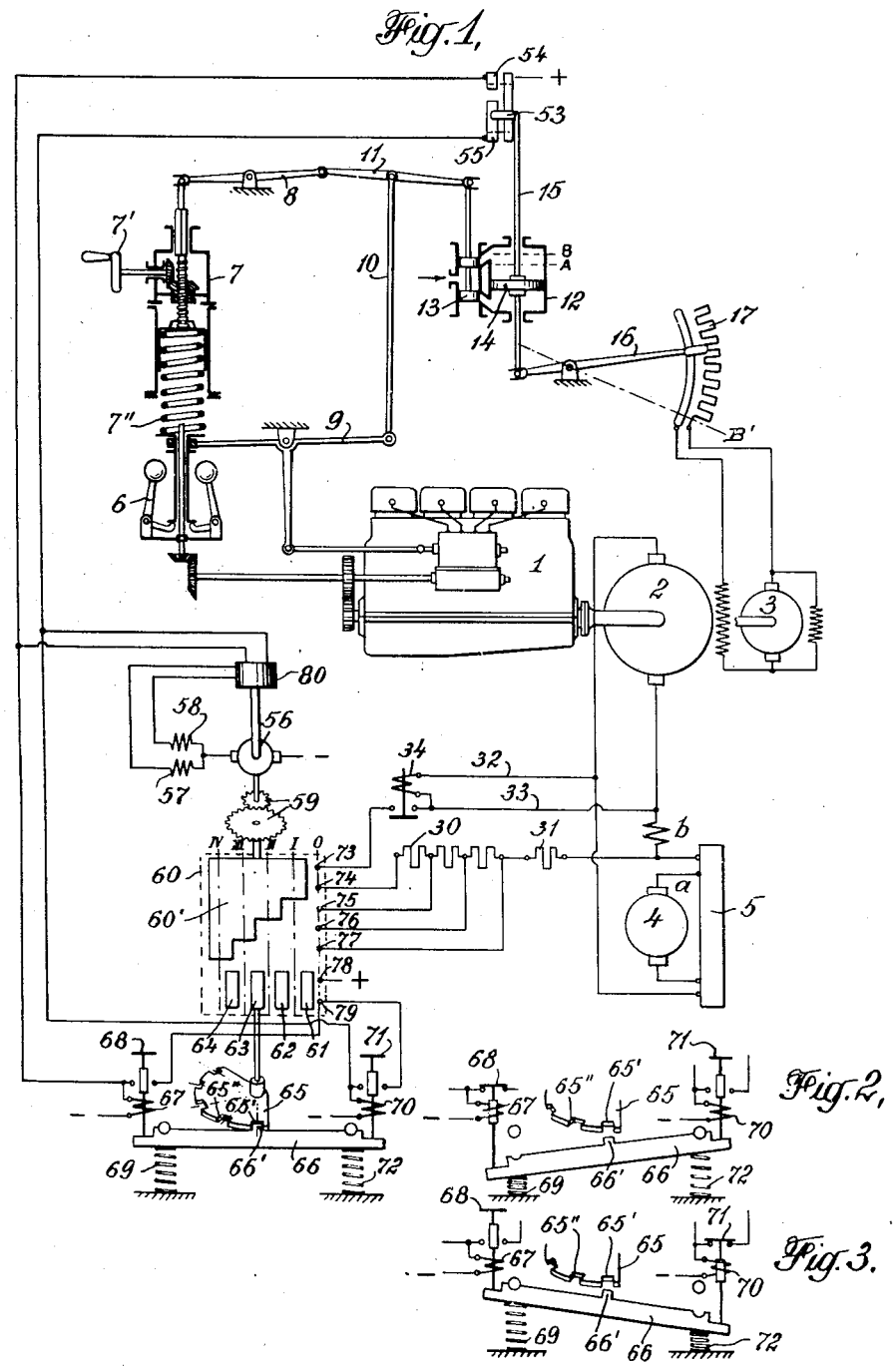

2,442,665

UNITED STATES PATENT OFFICE 2,442,665

DIESEL-ELECTRIC VEHICLE WITH AUTOMATIC FIELD WEAKENING OF THE DRIVING MOTORS

Oscar Schläpfer, Winterthur, Switzerland, assignor to Sulzer Frères, Société Anonyme, Winterthur, Switzerland Application March 7, 1945, Serial No. 581,474
In Switzerland March 9, 1944

4 Claims. (Cl. 318—154)

The invention relates to control apparatus for a Diesel-electric power plant used for the propulsion of a vehicle. In particular, it relates to control apparatus of the type in which a servomotor adjusting the weakening of the fields of the driving motors is controlled in accordance with the field regulator adjusting the excitation of the main generator to maintain a predetermined constant load on the Diesel engine at a constant speed, and in which the regulators for regulating the fields of the main generator and of the driving motors are designed for instance as astatic regulating members and the control member of the driving motor regulator has in its closed position so great a degree of overlapping that the field regulator of the generator can move, in the neighbourhood of the position for short-circuited resistance, without bringing this control member out of its closed position, over such a large range that the change of load presenting itself within this range is at least as great as the change of load caused by the greatest step of the field weakening.

According to this invention the regulator for the fields of the driving motor is provided with a device which ensures that the controlling switch will come to rest only when it has moved into a position in which it is completely over a contact.

The generator field regulator in control apparatus of the type described above will in practice not come to rest for some time. It is thus of no importance if the contact member on the lever moves only a little way over a fixed contact point as the high specific contact loading which thus arises cannot result in excessive heating of the parts. This is not true, however, in the case of the regulating switch for the driving motor fields. When this switch has once cut in a step, it may be a long time until it cuts it out again or until it moves on to another step, as in the meantime the regulator for the generator field again takes over the regulation as described in the specification of the earlier application of Oscar Schläpfer, Serial No. 554,892, filed September 20, 1944, now Patent No. 2,433,628, December 30, 1947. The switch may thus remain for a long time on one step so that, particularly when the loading of the contact is great, measures must be taken to prevent excessive contact heating as a result of the contacts being insufficiently covered.

These disadvantages are eliminated according to the present improvement by providing the regulating switch for the driving motor fields with a device which ensures that the switch moves completely over the contacts, a locking device or a notched disc being used to ensure that the regulating switch can only come to rest in definite positions. Since the contact path is then better utilised from the aspect of loading, the current load distributed over the whole surface of the contact may be increased. As a contact is broken rapidly and completely, the power to be switched can be increased for the contact and it is thus possible to manage with a smaller number of steps.

An embodiment of the invention is shown diagrammatically in the accompanying drawing, and in this the complete covering of the separate contacts by the field weakening switch is ensured by a locking mechanism. In the drawing Figure 1 is a diagram of the system while Figures 2 and 3 are detail diagrams of the locking mechanism.

As described in the specification of the earlier application Serial No. 554,892, an internal combustion engine 1 drives a main generator 2 and an auxiliary generator 3. The vehicle has a driving motor 4, apparatus 5 serving for reversing the direction of travel and for interrupting the main circuit, a governor 6 for the engine with a speed adjusting device 7, linkage 8—11, through which the valve 13 of the generator field regulator is controlled by the governor 6 of the engine, the generator field regulator 12—17 and the field weakening resistances 30, 31.

Instead of the field weakening switch being in the form of a lever as shown in application No. 554,892, the field weakening switch is here shown as a drum-shaped switch 60, which is driven by an electric motor 56 through gearing 59. According as the switch 53, which is operated by the piston 14 of the generator field regulator 12, connects the contact 54 or 55 with the field 57, respectively, or 58 of the motor 56, so will the contact drum 60 move to the right over the contacts 73—79 so as to decrease the resistance 30, or to the left so as to increase the resistance. As in application No. 554,892, a contactor 34 ensures that the field weakening is only possible at high voltage of the generator.

The parts so far described represent only a possible arrangement of the devices proposed in application No. 554,892. The further parts embody the present invention which has advantageous features which constitute a specific improvement over the earlier arrangement. They consist individually in a notched disc 65 with a locking bar 66, the motion of which is controlled by magnets 67 and 70 and springs 69 and 72. The contacts 61—64 arranged on the drum switch 60, together with the contacts 68 and 71 on the magnets 67 and 70, ensure that the motor 56 can only come to rest when the drum switch 60 is in a position in which the tongue 66' on the locking bar 66 engages a notch in the disc 65.

The contacts 61—64 and 68, 71 are not indispensable to the device here proposed and are only necessary when there is a danger that the inertia of the drum 60 and of the mass rotating with it is too small, after the contact 53 is switched out, to turn the notched disc 65 far enough for the locking bar 66 to fall into the next notch 65'.

The operation of the device, in so far as it cannot be gathered from the specification of the earlier application Serial No. 554,892, is as follows:

As long as the field regulating piston 14 has not reached the neighbourhood of the position B for short-circuiting the resistance 17, the switch 53 stands on the contact 55 and the field 58 of the motor 56 is connected to the source of the control current. At the same time the magnet 70 is excited (Figure 3), and pushes away the locking bar 66 in opposition to the pressure of the spring 72, so that the notched disc 65 can turn. In the position shown in Figure 1 the motor 56 has already turned the drum switch 60 completely to the left, so that the field weakening circuit between the contacts 73 and 74 is interrupted. A limit switch 80 rotated with the drum switch 60 has also interrupted the current through field 58 of the motor 56 in this position. The driving motor 4 now works with full field.

If the field regulating piston 14 approaches the position B, for short-circuiting the resistance 17 (position B'), the switch 53 leaves the contact 55 and later goes over on to the contact 54. The field 58 is switched out and the field 57 switched in. The motor 56 turns in the other direction after the magnet 67 has been excited and has pushed away the locking bar 66 in opposition to the pressure of the spring 69 (Figure 2). Provided that the minimum operating tension of the contactor 34 is reached, the element 60' closes the field weakening circuit at the contacts 73 and 74.

The driving motor current increases as a result of the field weakening, and thus also the load on the engine 1. Influenced by the governor 6, the field regulating piston 14 moves downwards, so that the current from the switch 53 to the contact 54 is interrupted. Without the contacts 61–64 and 78–79, the field 57 and the magnet 67 would thus be without current, and, if the parts in connection with the motor 56 have sufficient kinetic energy, the drum switch 60 turns still further until the locking bar 66 snaps into place, i. e., until the switch 60 has moved into the position I.

In order to make the device as independent as possible of conditions of inertia and friction, the magnet 67 switches in by means of the contact 68 (Figure 2) a current which feeds the magnet 67 and the field 57 from the drum switch 60 by way of the contacts 78, 79, as soon as the contacting piece 61 has covered these contacts. The motor 56 thus runs further in any case until the contacting piece 61 interrupts the circuit immediately before the position I.

The field regulating piston 14 now goes back until the overloading started by the first field weakening step is equalised. According to the earlier application Serial No. 554,892 the resistances 17 and 30 are so chosen relatively to each other that the piston 14 must not go back at any field weakening step far enough to cause the switch 53 to cover the contact 55.

If the generator current decreases again during the further acceleration of the vehicle, the piston 14 rises. When the contact 54 is again reached, the same process as previously described for the transition from step 0 to step I now takes place for the transition from step I to step II, and afterwards for the steps III and IV, until finally when the step IV is reached limit switch 80 rotated with the drum 60 cuts out the circuit through field 57 of the motor 56 if the switch 53 should remain on the contact 54.

If the drum switch 60 is on one of the steps I–IV and the switch 53 goes back on to the contact 55, the field 58 is switched in. The magnet 70 then pushes away the locking bar 66 (Figure 3) and the drum switch 60 moves to the left, whereby the field weakening of the driving motor 4 and thus the load on the engine 1 decrease. The governor 6 now causes the piston 14 to rise again and interrupts the connection between switch 53 and contact 55. The drum switch 60, however, still turns into the next position, as the magnet 70 and the field 58 are provided with current through the contacts 78 to 79, one of the contacts 61—64 and the contact 71. The switching back of the drum switch 60 step by step thus takes place in principle in exactly the same way as has been described for forward switching.

I claim:

1. In Diesel-driven electrical apparatus of the type comprising a Diesel engine, a speed governor driven by said engine, a generator driven by said engine, a field resistance for altering the field of said generator, a first servo-regulator for setting said field resistance, means connecting said speed governor to said first servo-regulator whereby the field resistance changes when the speed of said engine changes, the effect being that the load on said engine is kept constant, at least one electric motor driven by current from said generator, a further resistance for connecting in parallel to the field of each of said motors, switch means for each of said further resistances, a second servo-regulator for altering the switched-in part of each of said further resistances and means connecting said servo-regulators operatively with each other whereby said second servo-regulator, when said first servo-regulator has cut-out the maximum of said field resistance, is actuated with an increase in speed of said engine in the sense of a decrease in said further resistances and with a reduction in speed of said engine in the sense of an increase in said further resistances, in such a manner that the load on said engine is kept constant also in the load range of said second regulator, the improvement in which said further resistances each comprise a number of resistance steps successively connectable to and disconnectable from the field circuit of the motor associated therewith, said switch means each comprise a contact drum having a number of main contact areas thereon, each of said main contact areas serving to connect and disconnect one of said resistance steps from the field circuit of the motor associated therewith, said drum being controlled by said second servo-regulator, and there is provided a notched piece for bringing said contact drum to rest only when said main contact areas are in full contact or out of contact.

2. In Diesel-driven electrical apparatus according to claim 1, a pawl engaging in the notched piece when the contact drum is in a position in which the main contact areas are in full contact or out of contact, and means for withdrawing said pawl from engagement with said notched piece when the second servo-regulator is being influenced by the first servo-regulator.

3. Diesel-driven electrical apparatus according to claim 1 in which the second servo-regulator includes an electric servomotor, a pawl engaging in the notched piece when the contact drum is in a position in which the main contact areas are in full contact or out of contact, and at least one solenoid wired to be energized by current activating said servomotor and arranged to withdraw said pawl from engagement with said notched piece when energized.

4. Diesel-driven electrical apparatus according to claim 1 in which the second servo-regulator includes an electric servomotor, a pawl engaging in the notched piece when the contact drum is in a position in which the main contact areas are in full contact or out of contact, at least one solenoid wired to be energized by current activating said servomotor and arranged to withdraw said pawl from engagement with said notched piece when energized, additional switch means operated by said solenoid closing a further separate circuit through said solenoid when said solenoid has been energized and additional contacts on said contact drum interrupting said further solenoid circuit whenever the main contact areas are in full contact or out of contact.

OSCAR SCHLÄPFER.

REFERENCES CITED

The following references are of record in the file of this patent:

UNITED STATES PATENTS

| Number | Name | Date |
|---|---|---|
| 786,376 | Nilson | Apr. 4, 1905 |
| 1,730,786 | Rosenthal | Oct. 8, 1929 |
| 1,900,706 | Godsey | Mar. 7, 1933 |
| 2,131,527 | Sousedik | Sept. 27, 1938 |
| 2,145,611 | Schlaepfer | Jan. 31, 1939 |
| 2,256,294 | Schlaepfer | Sept. 16, 1941 |
| 2,424,310 | Frisch | July 22, 1947 |